J. ROBSON.
POWER TRANSMISSION GEAR.
APPLICATION FILED FEB. 11, 1915.

1,243,223.

Patented Oct. 16, 1917.
4 SHEETS—SHEET 1.

Witnesses:

Inventor:
John Robson

J. ROBSON.
POWER TRANSMISSION GEAR.
APPLICATION FILED FEB. 11, 1915.
1,243,223.
Patented Oct. 16, 1917.
4 SHEETS—SHEET 2.
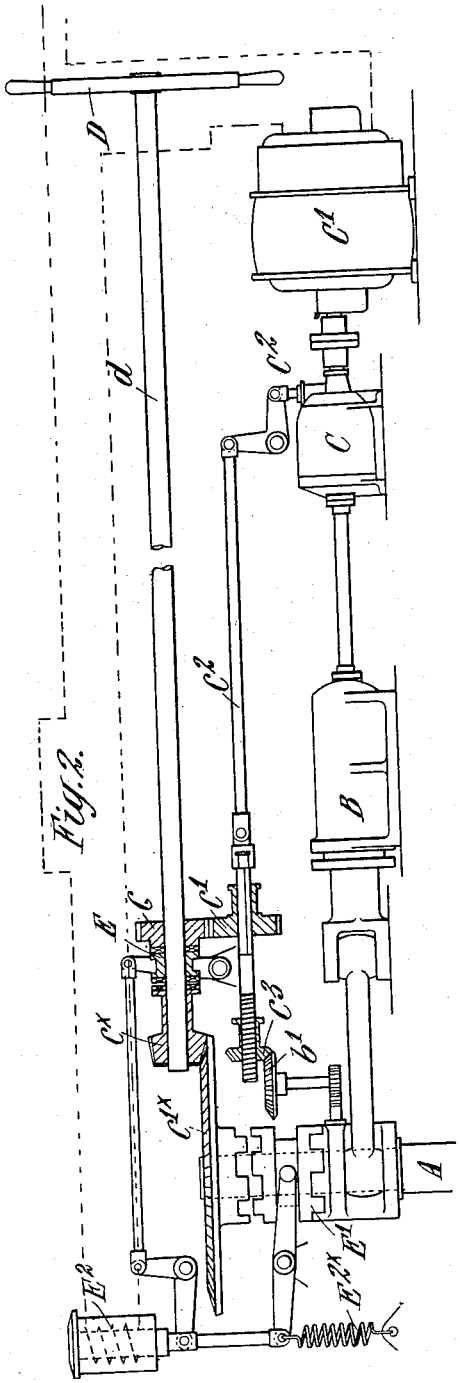
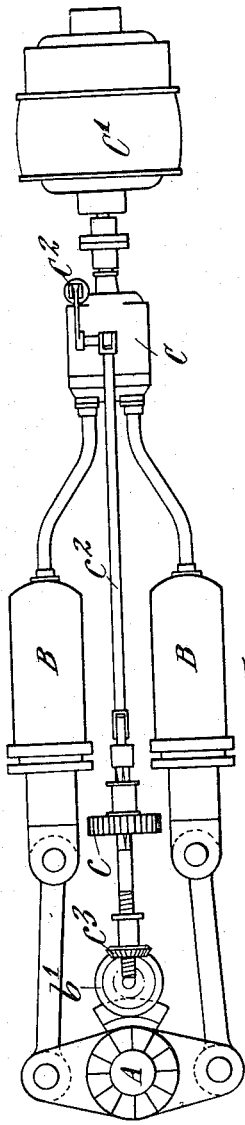
Witnesses:
Inventor:
John Robson

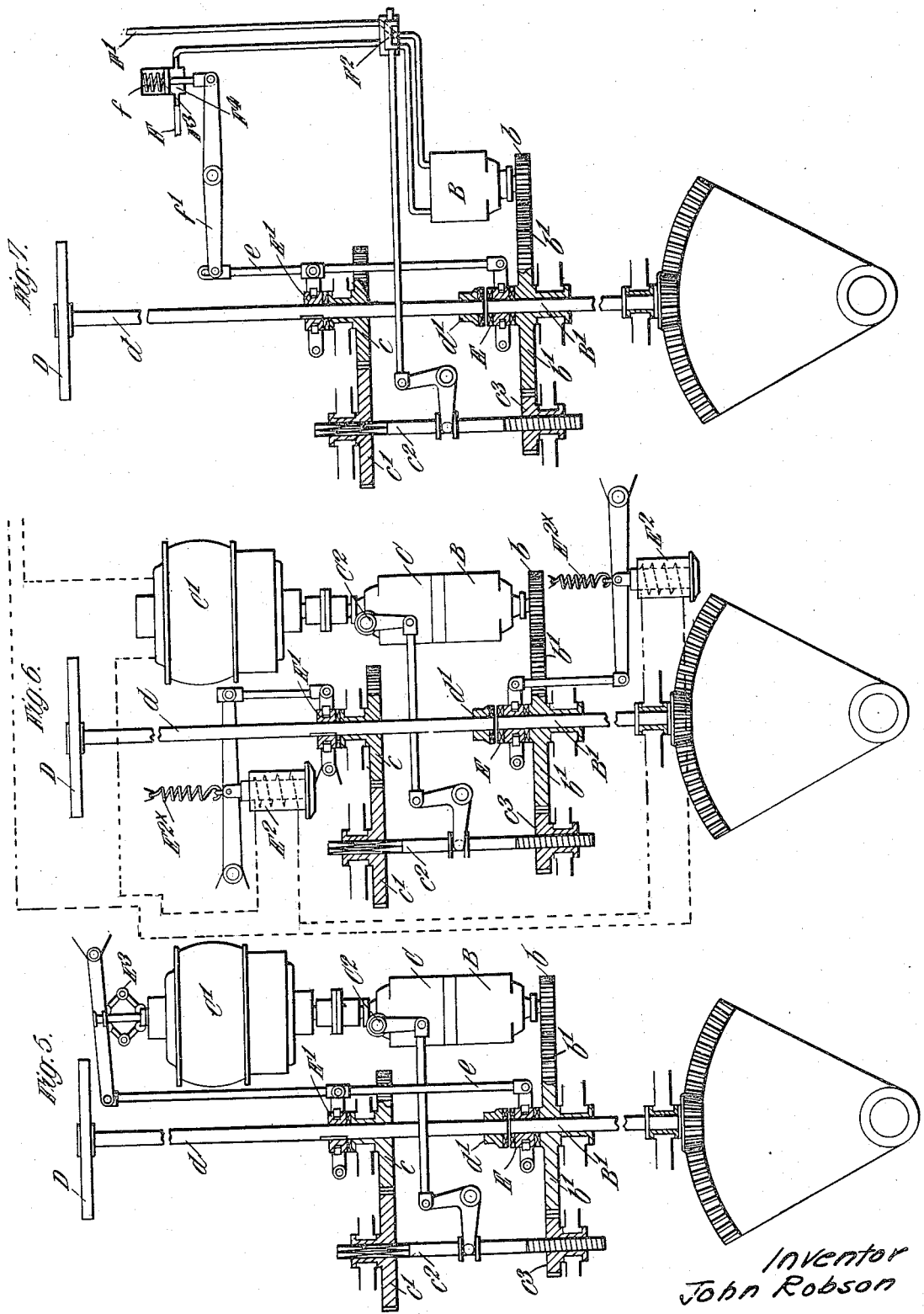

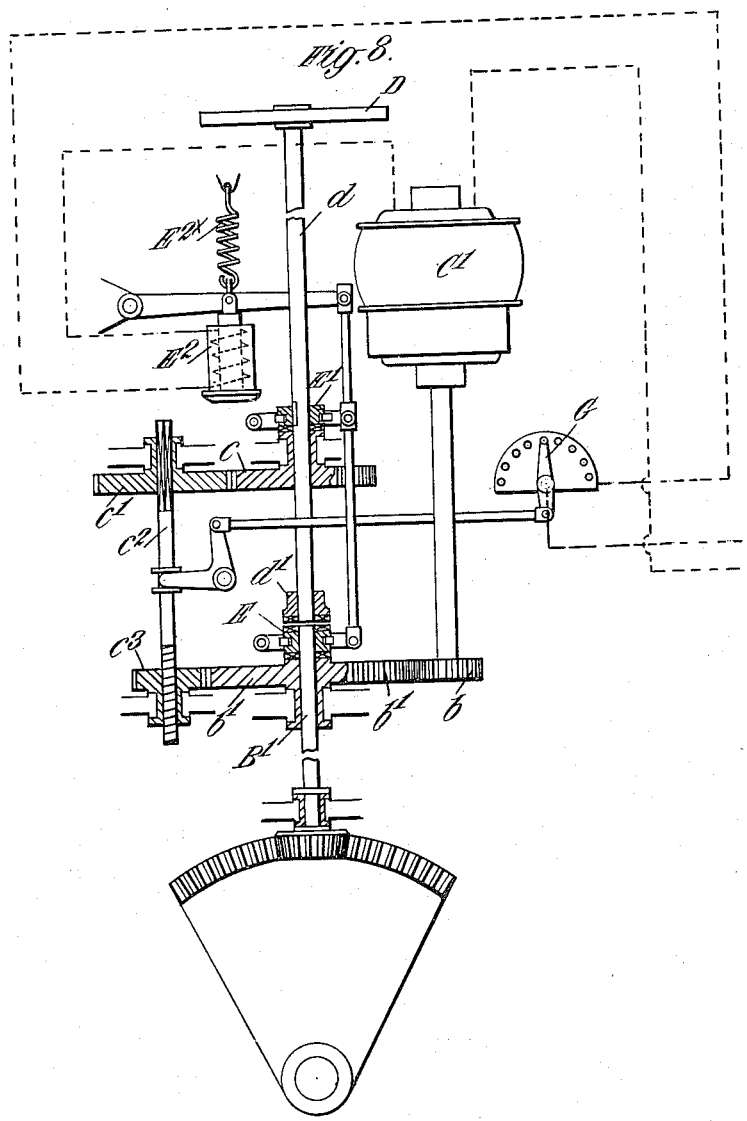

UNITED STATES PATENT OFFICE.

JOHN ROBSON, OF WESTMINSTER, LONDON, ENGLAND, ASSIGNOR TO THE VARIABLE SPEED GEAR LIMITED, OF WESTMINSTER, ENGLAND.

POWER-TRANSMISSION GEAR.

1,243,223.

Specification of Letters Patent. Patented Oct. 16, 1917.

Application filed February 11, 1915. Serial No. 7,641.

*To all whom it may concern:*

Be it known that I, JOHN ROBSON, a subject of the King of Great Britain, residing at Vickers House, Broadway, Westminster, in the county of London, England, have invented certain new and useful Improvements in or Relating to Power-Transmission Gear, of which the following is a specification.

This invention relates to power transmission gear and has particular reference to an improved means of utilizing such gear for the steering apparatus of submarine and other boats in which a clutch device is employed for normally connecting the said gear to the rudder post, this clutch device being capable of actuation to declutch the rudder post from the power transmission gear and clutch it to the steering handwheel so that the rudder post can be operated by hand in the event of the power transmission gear breaking down. In mechanism involving the use of a hydraulic motor for actuating the rudder or other member that is to be operated, a hand operated clutch device has been used for the purpose of de-clutching the handwheel from the control device and the motor from the rudder and clutching the handwheel to the rudder. The fact that this clutch device has to be operated by hand leads to loss of time when in case of emergency it is necessary to immediately resort to manual operation when the motive power fails.

The chief object of the invention is to provide improved means for enabling the change from power to hand actuation to be effected without the necessity of employing a manually operated clutch device.

According to this invention I provide means whereby, in the event of the power transmission gear breaking down, the clutch device that normally connects the gear to the rudder (or other member to be operated) will be automatically caused to declutch the rudder from the said gear and to clutch it to the steering or other handwheel. When an electric motor is employed as the prime mover, the means for automatically effecting the clutching and declutching may comprise a solenoid arranged in the motor circuit, the core of this solenoid being connected to the clutch device. When this electric motor operates the pump unit of a variable speed hydraulic transmission gear, the solenoid may normally (*i. e.* when the motor circuit is operative) be retained against the resistance of a spring in a position to hold the motor unit clutched to the rudder and the hand-wheel clutched to the control device of the said gear but declutched from the rudder. In the event of the electric current no longer passing, the spring moves the clutch device to declutch the motor unit from the rudder and the handwheel from the rudder and to clutch the handwheel to the rudder. In addition to or instead of the solenoid a centrifugal governor connected to the clutch device may be employed for effecting a positive movement of the said device in the event of the motor breaking down. This centrifugal governor would be employed alone when the prime mover is rotary and other than an electric motor.

In order that the said invention may be clearly understood and readily carried into effect I will describe the same more fully with reference to the accompanying drawings, in which:—

Figs. 2 and 3 are respectively a side elevation and a plan (with the upper portion of Fig. 2 omitted for sake of clearness) showing more or less diagrammatically another form of the invention also applied to the steering apparatus of a boat, and Figs. 4, 5, 6, 7 and 8 are views similar to Fig. 1 showing modified forms of the invention.

In these figures, A is the rudder post and B the hydraulic motor for actuating the rudder post. This motor is in Fig. 1 of the rotary type and in Figs. 2 and 3 is constituted by two presses. C represents a variable delivery and reversible pump for supplying liquid under pressure to the motor B, this pump being driven by a constant speed prime mover $C'$. $C^2$ represents the shaft appertaining to the control device of the pump. D represents the handwheel for adjusting the said control device when the rudder post is being operated by power and for actuating the rudder post by hand when required. E, E' represent the clutch devices and $E^2$ represents the solenoid appertaining thereto. $E^3$ (Fig. 5) represents the centrifugal governor that supplements or replaces the solenoid $E^2$.

Figure 1:
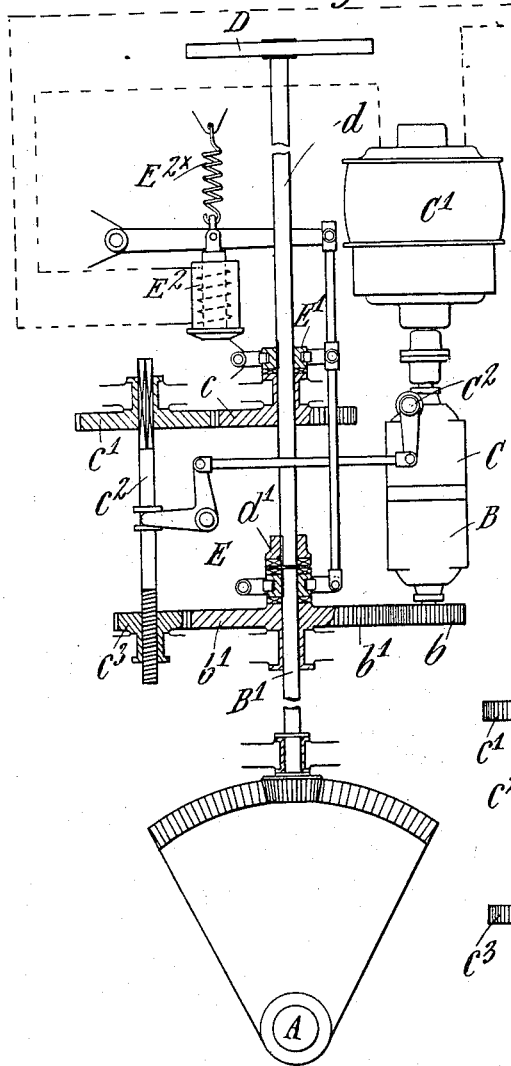
Figure 1 is a more or less diagrammatic plan showing a constructional form of the invention applied to the steering apparatus of a boat.

In the example shown by Fig. 1, the shaft of the motor B carries a pinion $b$ gearing with a spur wheel $b'$ which is loosely mounted on the shaft suitably geared to the rudder post A. The spur wheel $b'$ is formed with clutch jaws adapted to engage with the aforesaid clutch member E which is slidably keyed to the shaft B'. The clutch member E is double faced and is adapted, when displaced from the position shown, to engage with a clutch $d'$ keyed on a shaft $d$ connected with the aforesaid handwheel D. To the shaft $d$ is slidably keyed the other clutch member E' which normally (as shown) engages with a spur wheel $c$ gearing with another spur wheel $c'$. The latter wheel is slidably connected to a counter shaft $c^2$ which is screw threaded to engage with a pinion $c^3$ gearing with the aforesaid spur wheel $b'$. This counter shaft is suitably connected to the shaft $C^2$ of the control device of the pump.

The two clutch members, E, E' are connected together and to the core of the solenoid $E^2$, by a rod $e$ this core being controlled by a spring $E^{2x}$.

When the rudder post is being operated by power the clutch members are held in the position shown, by the solenoid $E^2$, that is to say the member E connects the motor B with the rudder post A and the clutch member E' connects the hand wheel D with the shaft $C^2$. In this position of the clutch members, the parts $c'$, $c^2$ and $c^3$ operate as a hunting gear to bring the control device of the pump C to rest in the zero position as is well understood. That is to say, the counter shaft $c^2$ is slidably connected at one end to the spur wheel $c'$ and at the other end is screw threaded to engage with threads formed in the pinion $c^3$. Thus when the hand wheel D is rotated the counter shaft $c^2$ also rotates and is screwed into or out of the pinion $c^3$ which is held stationary owing to its connection with the motor unit B. The axial movement of the counter shaft $c^2$ effects the required displacement of the shaft $C^2$ of the control device. The consequent movement of the motor unit B rotates the pinion $c^3$ and displaces the counter shaft $C^2$ axially in the reverse direction, the spur wheel $c'$ being at this time held against rotation by the hand wheel D. This reverse displacement of the counter shaft returns the shaft $C^2$ to its original position and brings the motor unit B to rest.

If the circuit through the electric prime mover C' should fail, the solenoid $E^2$ (which is arranged in this circuit) will be deënergized and the spring $E^{2x}$ will displace the clutch member E' from engagement with the spur wheel $c$ and the member E from engagement with the spur wheel $b'$ and into engagement with the clutch $d'$. The shaft $d$ is thus disconnected from the counter shaft $c^2$ and connected to the shaft B' which in turn is disconnected from the motor B. The rudder post A can then be actuated from the hand-wheel D. The governor $E^3$, Fig. 5, operates upon the clutch members directly when the speed of the prime mover C' materially falls.

In the construction shown by Figs. 2 and 3, motors X of the press type are used, the rams being connected to a crosshead on the rudder post A. In other respects this construction is substantially the same as that illustrated by Fig. 1. It should be observed, however, that the clutch member E is double faced, this being necessary to provide a connection between the shaft $d$ and the rudder post A through bevel wheels $c^x$, $c'^x$ when the solenoid $E^2$ is deënergized. It will be understood that in both the constructions herein described, two solenoids may be employed, one operating upon each of the clutch members E, E', as shown in Fig. 6.

Figure 4:
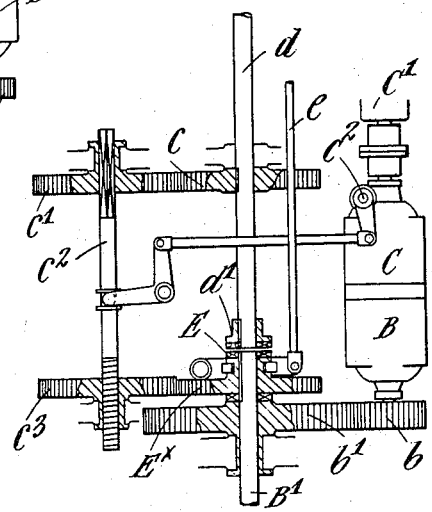

In the construction shown by Fig. 4 the clutch E' is dispensed with. In this case the clutch E is formed on a toothed wheel $E^x$ meshing with the toothed wheel $c^3$ and the toothed wheel $c$ is rigidly mounted on the shaft $d$ that meshes with the toothed wheel $c'$. The toothed wheels $E^x$ $c^3$ are so formed that they remain in constant engagement with each other in spite of the sliding movement of the toothed wheel $E^x$ carrying the clutch, so that the hunting gear remains in operation whether the rudder post is being actuated by the steering wheel or by the motor unit B; in the latter case the hunting gear operates in substantially the same manner as that above described and in the former case the control device $C^2$ remains stationary owing to the fact that the tendency for the steering wheel shaft $d$ to displace the control device through the hunting gear is nullified by the movement of the toothed wheel $E^x$. In this construction the number of the parts of the apparatus is reduced, the load on the solenoid for operating the clutch is reduced as compared with the arrangement in which two clutches are employed, and the hunting gear always remains in its correct relative position when the rudder is being operated manually by the steering hand wheel.

When the improved apparatus is employed for actuating the steering mechanism of a submarine, the said apparatus may be arranged in the aft compartment contiguous to the rudder post, the electric motor C' for driving the pump C being preferably arranged in one of the middle compartments so that it is readily accessible for adjustment. The apparatus may be used either in conjunction with the vertical rudder, or with the horizontal rudders of hydroplanes.

Instead of employing a pump for supplying pressure fluid to a rotary or other motor or motors, the latter may as shown in Fig. 7 be driven by pressure fluid obtained from hydraulic or pneumatic mains F, F', of which the former is the pressure main and and the latter the exhaust main. In this case the aforesaid control device of the pump is replaced by a control valve $F^2$ arranged between the motor B and the mains F, F' and the clutch devices E, E' are operated by a suitable apparatus controlled by the pressure of the fluid in the main F. This apparatus comprises a piston $F^3$ arranged in a chamber $F^4$ connected to the main F. The piston is controlled by a spring $f$ and is connected to one end of a lever $f'$ whose other end is connected, preferably through a pin and slot arrangement, to the aforesaid rod $e$ of the clutches E, E'. If the pressure of the fluid should fail the spring $f$ will rock the lever $f'$ and thereby move the clutch E' into its disengaging position and the clutch E into engagement with the part $d'$ as previously explained. The pin and slot arrangement between the lever $f'$ and the rod $e$ enables small movements of the lever $f'$ to take place (due to variations in the pressure of the fluid in the main F) without moving the rod $e$.

An electric motor can as shown by Fig. 8 be employed for operating the rudder or other member directly instead of through the variable speed hydraulic gear above described, and in this case a rheostat G takes the place of the control device of the pump unit, the aforesaid solenoid or solenoids $E^2$ being employed for operating the clutch devices.

The improved apparatus may be used in any circumstances where it may be desirable to change quickly from power operation of any moving part to hand operation. Such a result is desirable not only in the steering apparatus of submarine and other vessels, but, for example, in the elevating and training mechanism of ordnance, and in winding and hoisting mechanism in general.

What I claim and desire to secure by Letters Patent of the United States is:—

1. In power transmission gear, the combination with the operating motor, the member driven thereby, and a hand operated member, of means, coming into operation automatically when the power transmission gear breaks down, for disconnecting said motor from the member driven thereby and connecting this member to the hand operated member.

2. In power transmission gear, the combination with the operating motor, the member driven thereby, and a hand operated member, of a clutch device normally connecting said motor to the member driven thereby, and means, coming into operation automatically when the power transmission gear breaks down, for causing said clutch device to disconnect the motor from the member driven thereby and to connect this member to the hand operated member.

3. In power transmission gear, the combination with the operating motor, the member driven thereby, and a hand operated member, of a solenoid arranged in the motor circuit for automatically disconnecting said motor from the member driven thereby and connecting this member to the hand operated member when electric current ceases to pass to the motor.

4. In power transmission gear, the combination with the operating motor, the member driven thereby, the control device of said motor, and a hand operated control member connected to said control device, of means, coming into operation automatically when the power transmission gear breaks down, for disconnecting said motor from the member driven thereby, for disconnecting the hand operated control member from the control device and for connecting the last mentioned member to the member normally driven by the motor.

5. In power transmission gear, the combination with the operating motor, the member normally driven thereby, the control device of said motor and the hand operated control member normally connected to said device, of a clutch normally connecting the motor to the member driven thereby, another clutch normally connecting the hand operated control member to the control device, and means, coming into operation automatically when the power transmission gear breaks down, for moving the first mentioned clutch to disconnect the motor from the member normally driven thereby and connect this member to the hand operated control member, and for moving the other clutch to disconnect the hand operated control member from the control device.

6. In power transmission gear, the combination with the operating motor, the member normally driven thereby, the control device of said motor and the hand operated control member normally connected to said device through a hunting control gear which is also actuated by said member normally driven by the motor, of a clutch normally connecting the motor to the member driven thereby, another clutch normally connecting the hand operated control member to the hunting control gear and means, coming into operation automatically when the power transmission gear breaks down, for moving the first mentioned clutch to disconnect the motor from the member normally driven thereby and connect this member to the hand operated control member and for moving the other clutch to disconnect the hand operated control member from the hunting control gear.

In testimony whereof I affix my signature in presence of two witnesses.

JNO. ROBSON.

Witnesses:
T. SELBY WARDLE,
THOS. F. HARGREAVES.